(12) United States Patent
Palmieri

(10) Patent No.: US 8,161,645 B2
(45) Date of Patent: *Apr. 24, 2012

(54) METHOD OF PRODUCING VACUUM SOLAR THERMAL PANELS WITH A VACUUM TIGHT GLASS-METAL SEAL

(75) Inventor: Vittorio Palmieri, Geneva (CH)

(73) Assignee: TVP Solar SA, Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/962,398

(22) Filed: Dec. 7, 2010

(65) Prior Publication Data

US 2011/0072662 A1 Mar. 31, 2011

Related U.S. Application Data

(62) Division of application No. 12/812,242, filed as application No. PCT/EP2009/004937 on Jul. 8, 2009, now Pat. No. 8,096,296.

(51) Int. Cl.
*B21D 53/06* (2006.01)
(52) U.S. Cl. ................................. 29/890.033
(58) Field of Classification Search .............. 29/890.033
See application file for complete search history.

(56) References Cited

U.S. PATENT DOCUMENTS

| | | | |
|---|---|---|---|
| 3,385,989 A | 5/1968 | Vogelpohl | |
| 3,632,325 A | 1/1972 | Evey et al. | |
| 3,981,293 A | 9/1976 | Gillery | |
| 4,095,428 A | 6/1978 | Warren | |
| 4,332,241 A | 6/1982 | Dalstein et al. | |
| 4,493,940 A | 1/1985 | Takaoka | |
| 4,535,631 A * | 8/1985 | Sinha et al. | ...... 73/703 |
| 4,640,700 A | 2/1987 | Takei et al. | |
| 5,653,222 A | 8/1997 | Newman | |
| 5,905,335 A * | 5/1999 | Fushimi et al. | ...... 313/495 |
| 2005/0181925 A1 | 8/2005 | Kuckelkorn et al. | |

(Continued)

FOREIGN PATENT DOCUMENTS

EP 1 706 678 8/2007

(Continued)

OTHER PUBLICATIONS

U.S. Appl. No. 13/056,532, filed Jan. 28, 2011, Palmieri.

(Continued)

*Primary Examiner* — David Bryant
*Assistant Examiner* — Moshe Wilensky
(74) *Attorney, Agent, or Firm* — Oblon, Spivak, McClelland, Maier & Neustadt, L.L.P.

(57) ABSTRACT

A vacuum solar thermal panel including a vacuum envelope defining a sealed volume and able to withstand atmospheric pressure when evacuated, at least one heat absorber being disposed inside the vacuum envelope, a pipe entering and exiting the envelope and being in contact with the heat absorber, the vacuum envelope including a first plate made of glass, a peripheral frame, a metallic peripheral belt being joined to the first plate by way of a vacuum tight bulk glass-metal seal, including glass material and obtained by fusion and subsequent solidification. The metallic peripheral belt includes at least one elastically deformable portion that prevents the bulk glass-metal seal from getting damaged and is no more vacuum tight when subject to the evacuation process of the envelope and the thermal treatments of the panel and the potential reciprocal displacements of the glass plate and the joined metallic peripheral belt.

9 Claims, 6 Drawing Sheets

U.S. PATENT DOCUMENTS

2007/0039611 A1    2/2007    Benvenuti
2010/0006090 A1    1/2010    Palmieri

FOREIGN PATENT DOCUMENTS

| | | |
|---|---|---|
| FR | 1 447 732 | 7/1966 |
| FR | 2 492 956 | 4/1982 |
| GB | 1 172 744 | 12/1969 |
| GB | 1 439 444 | 6/1976 |
| GB | 2 259 732 | 3/1993 |
| GB | 2 261 247 | 5/1993 |
| JP | 59 119137 | 7/1984 |

OTHER PUBLICATIONS

U.S. Appl. No. 13/120,565, filed Mar. 23, 2011, Palmieri.

* cited by examiner

METHOD OF PRODUCING VACUUM SOLAR THERMAL PANELS WITH A VACUUM TIGHT GLASS-METAL SEAL

CROSS-REFERENCE TO RELATED APPLICATIONS

This application is a divisional Application of and is based upon and claims the benefit of priority under 35 U.S.C. §120 from U.S. Ser. No. 12/812,243, filed Jul. 9, 2010, herein incorporated by reference, which is a National Stage Application of International Application No. PCT/EP09/004,937, filed Jul. 8, 2009, which claims the benefit of priority under 35 U.S.C. §119 from Italian priority document, MI2008A001245, filed in Italy on Jul. 9, 2008.

The present invention relates to a vacuum solar thermal panel and a method for the production of said vacuum solar thermal panel according to the preamble of the main claims.

Evacuated tube solar panels are normally obtained by connecting in parallel multiple heat pipes, with heat absorber fins attached thereto, sealed in individual evacuated glass tubes.

This design has the drawback of providing significant dead space in between heat absorbers as well as having a significant portion of the heat transfer fluid circuitry outside vacuum insulation.

To overcome these limitations, flat vacuum solar thermal panels have been developed comprising a flat vacuum tight envelope with a glass plate transparent to the visible solar radiation. Inside the vacuum envelope there are disposed heat absorbers and a pipe entering and exiting the envelope connected to the heat absorbers. The solar radiation enters the envelope through the glass plate, is absorbed by the heat absorbers and converted into heat, which is transferred to the pipe and to the thermal fluid flowing in the pipe. High vacuum is kept inside the envelope enclosing the heat absorbers and the pipe connected thereto, in order to prevent heat from escaping to the external environment by means of convection.

U.S. Pat. No. 4,332,241 and EP 1706678 disclose a vacuum solar thermal panel comprising two parallel glass plates and a metallic spacing frame for supporting the glass plates in a spaced-apart arrangement.

Surface portions of the glass plates have a metallic coating, in order to allow soldering to the metallic spacing frame, thus providing a vacuum tight sealing between the glass plates and the metallic spacing frame. Furthermore, the spacing frame preferably comprises deformable bars of ribbons made of lead or soft metal to be soldered to the metallic coating of the glass plates, in order to limit the stress induced in the glass-metal seal by thermal expansion and pressure differences.

GB 2259732 discloses a generic thermal insulation panel with two parallel plates and a flexible peripheral seal, preferably made of silicon rubber or polysulfide, to allow a movement of the plates relative to each other due to the thermal expansion of the gas contained inside the panel.

Both these technologies have severe intrinsic limitations. Most soft metal (i.e. lead) are toxic and their use is becoming more and more restricted. Metallization of glass relies on surface coatings which can deteriorate much faster than bulk materials due to the fact that they extend only for few atomic layers. On the other hand glues, silicon rubber or polysulfide allow gas permeation over time, because of their organic constituents, thus preventing their use for long term high vacuum applications.

An object of the present invention is to overcome drawbacks of the prior art solar thermal panels by providing a vacuum solar thermal panel comprising a long lasting and reliable vacuum envelope.

Another object of the present application is to reduce the stress applied to the glass-metal seal due to atmospheric pressure and differential thermal expansion of the panel constituents when heated during the bake-out cycle.

Another object of the invention is to provide a flat vacuum solar thermal panel with two parallel plates.

Another object of the invention is to provide a flat vacuum solar thermal panel with enhanced efficiency at temperatures above 200° C.

A further object of the invention is to provide a method for obtaining such a vacuum solar thermal panel.

The present invention will be more fully understood and appreciated from the following detailed description taken in conjunction with the attached drawings, in which.

Figure 1:
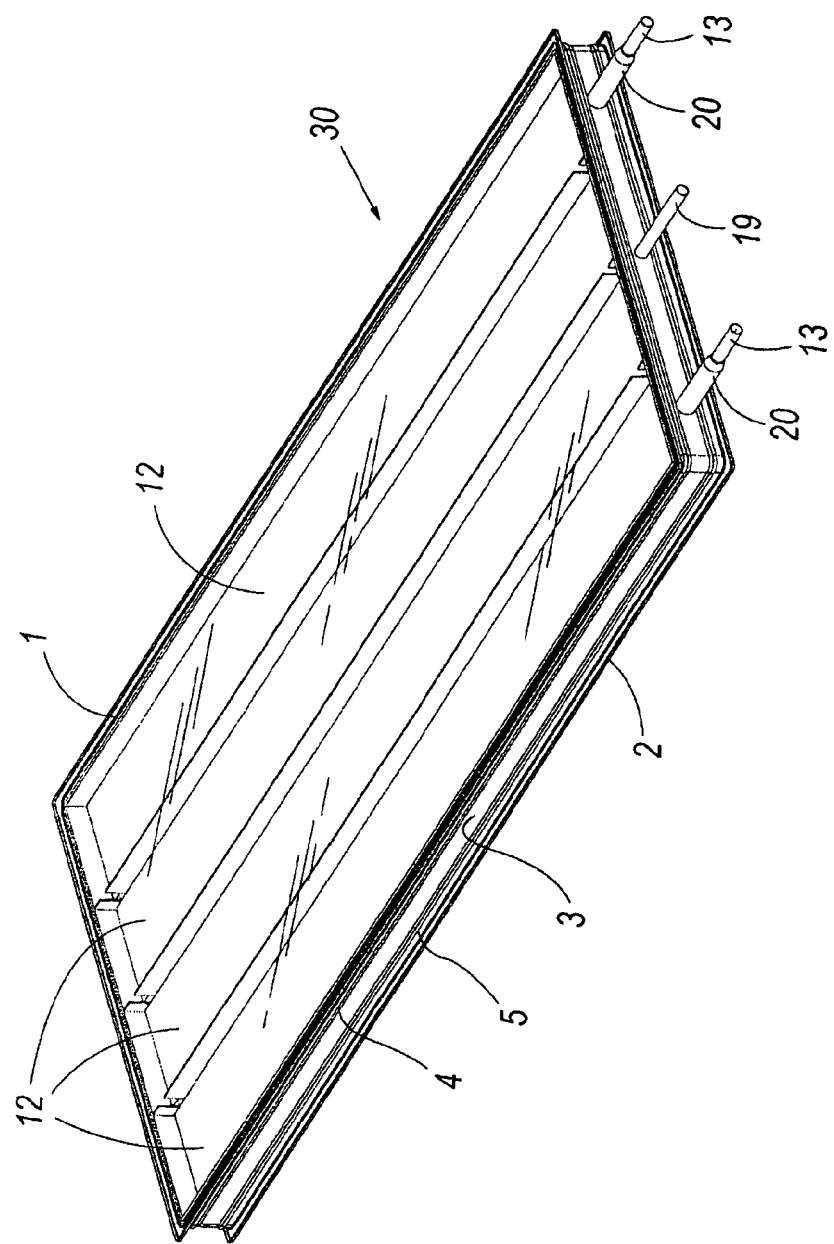
FIG. 1 shows a perspective view of a vacuum solar thermal panel according to the invention.

The vacuum solar thermal panel according to the invention (FIGS. 1 and 2) comprises a vacuum envelope 30 defining a sealed volume, able to withstand atmospheric pressure when evacuated, with at least a first plate 1 made of glass transparent to the visible solar radiation. A pipe 13 for the thermal fluid with attached multiple heat absorbers 12 in good thermal contact with the same pipe is enclosed in the vacuum envelope to avoid heat transfer to the environment due to convection. Said pipe 13 enters and exits the vacuum envelope 30 through the exit ports 20. Of course more than one such a pipe 13 can be present.

The vacuum envelope 30 can have a first and a second parallel plate 1 and 2, both made of glass, or a first plate 1, made of glass, and a second plate 2, made of metal, kept in a spaced-apart arrangement by a chassis 18, disposed inside the envelope 30 between the plates 1 and 2, and a peripheral frame 3. Said chassis 18 and the peripheral frame 3 can also support parts of the pipe 13 inside the envelope 30 and the heat absorbers 12 connected thereto.

As shown in FIG. 1 the solar thermal panel is flat. The vacuum envelope 30 of the panel comprises a first and a second plate 1 and 2, made of glass, and a metallic peripheral frame 3. It also comprises two metallic peripheral belts 4 and 5 each one joining the glass plates 1 and 2 with the metallic peripheral frame 3. If the above plates are made of glass, the solar panel has two active surfaces (double sided flat panel), one collecting the solar radiation directly from the sun and the other collecting the solar radiation reflected by a suitable mirror (not shown in the figure).

Figure 6:
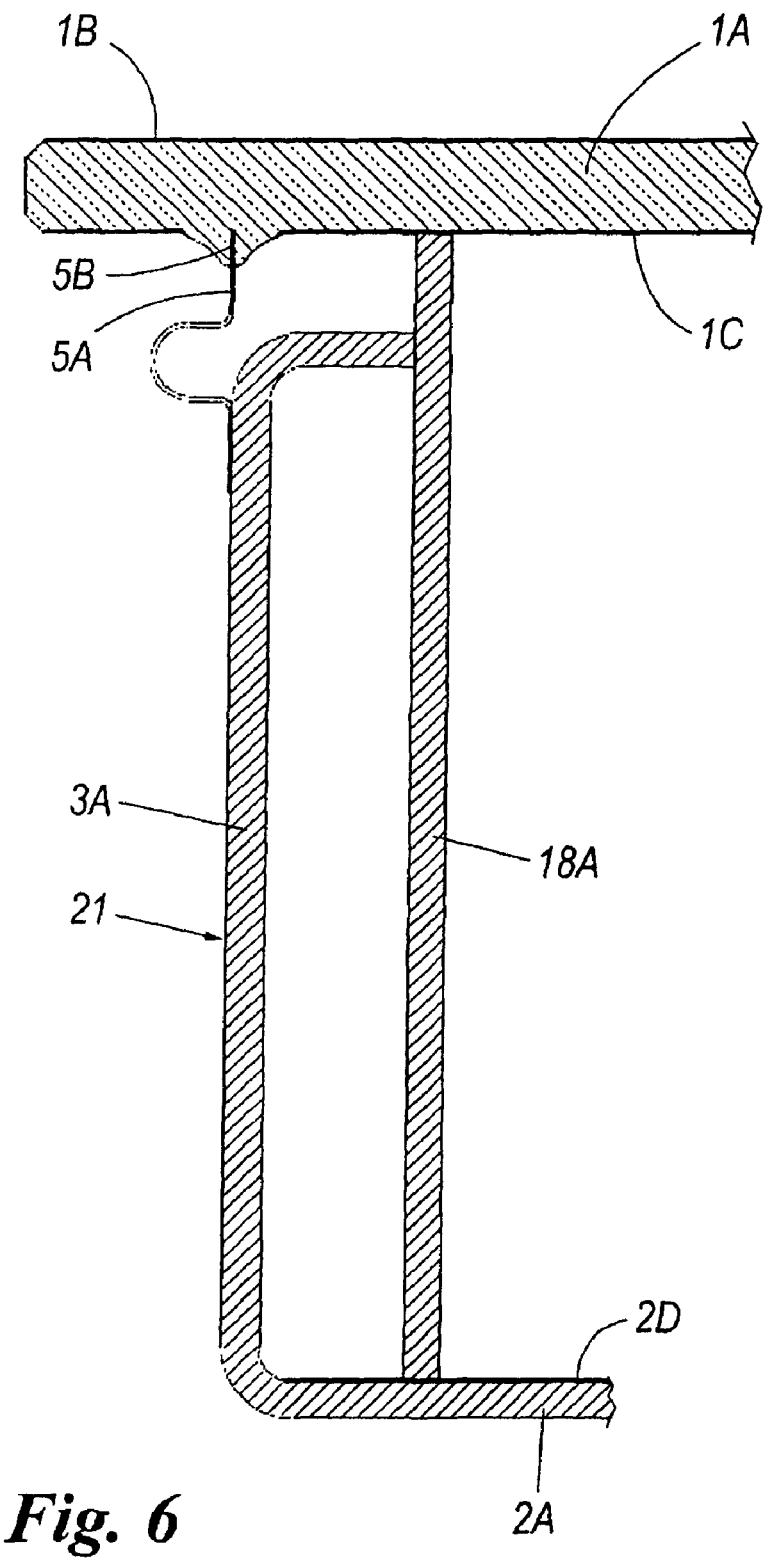

In case the first plate 1 should be made of glass and the second plate 2 of metal the solar panel would be single sided, i.e. with only one side capable of collecting solar radiation. When the second plate is made of metal, the peripheral frame can be directly joined to the second plate by means of conventional metal-metal soldering, without the presence of a flexible peripheral belt, or as shown in FIG. 6 said peripheral frame 3A is in one piece with the second metal plate 2A.

Glass plate composition should be chosen such as to maximise transparency (transmission coefficient ≦0.91).

Moreover, it is commonly known to the experts in the field that by applying a coating to the glass plate, as it reduces the glass transparency, it will also reduce the amount of solar energy entering the panel and thus the panel efficiency. According to the invention, the opposite can be achieved. In fact, by applying an infra red low emitting coating (1C, 2C) to the inner side of the glass plates, even reducing transmission in the visible part of the solar spectrum, the efficiency of the panel is increased at high temperature because of the predominant effect of reduction of radiation losses deriving from the heat absorber infrared emissions.

To get this result, the low emitting coating is chosen in such a way: that the reflectivity for wavelengths comprised between 4 and 6 micron (corresponding to a temperature range of 200-400° C.) is more than 0.9 and that the transmission for wavelengths comprised between 0.25 and 1 micron is more than 0.7. A panel operating for example at 265° C. would have an infra red emission from the heat absorber peaked at 5.4 micron.

It has been found that a coating according to the invention may increase the panel efficiency at 265° C. of more than 30%

According to the invention it has also been found that the panel efficiency may be further increased by applying a second coating (1B, 2B) to the outer surface of the glass plates. This second coating being a commonly used anti reflective coating.

According to the invention it has also been found that, in the case of a single sided panel, the efficiency may be further increased by applying a third coating (FIG. 6) to the inner surface of the metal plate to lower its emissivity. This third coating being for example a commonly used electrodeposited copper layer.

Additionally, glass should be thermally pre-stressed or stratified to improve safety and reduce thickness. In the case of thermally pre-stressed extra-clear soda lime float glass, the thickness of glass plates should be about 5 mm, when considering a chassis 18 with support structures spaced 120-160 mm apart.

Figure 2:
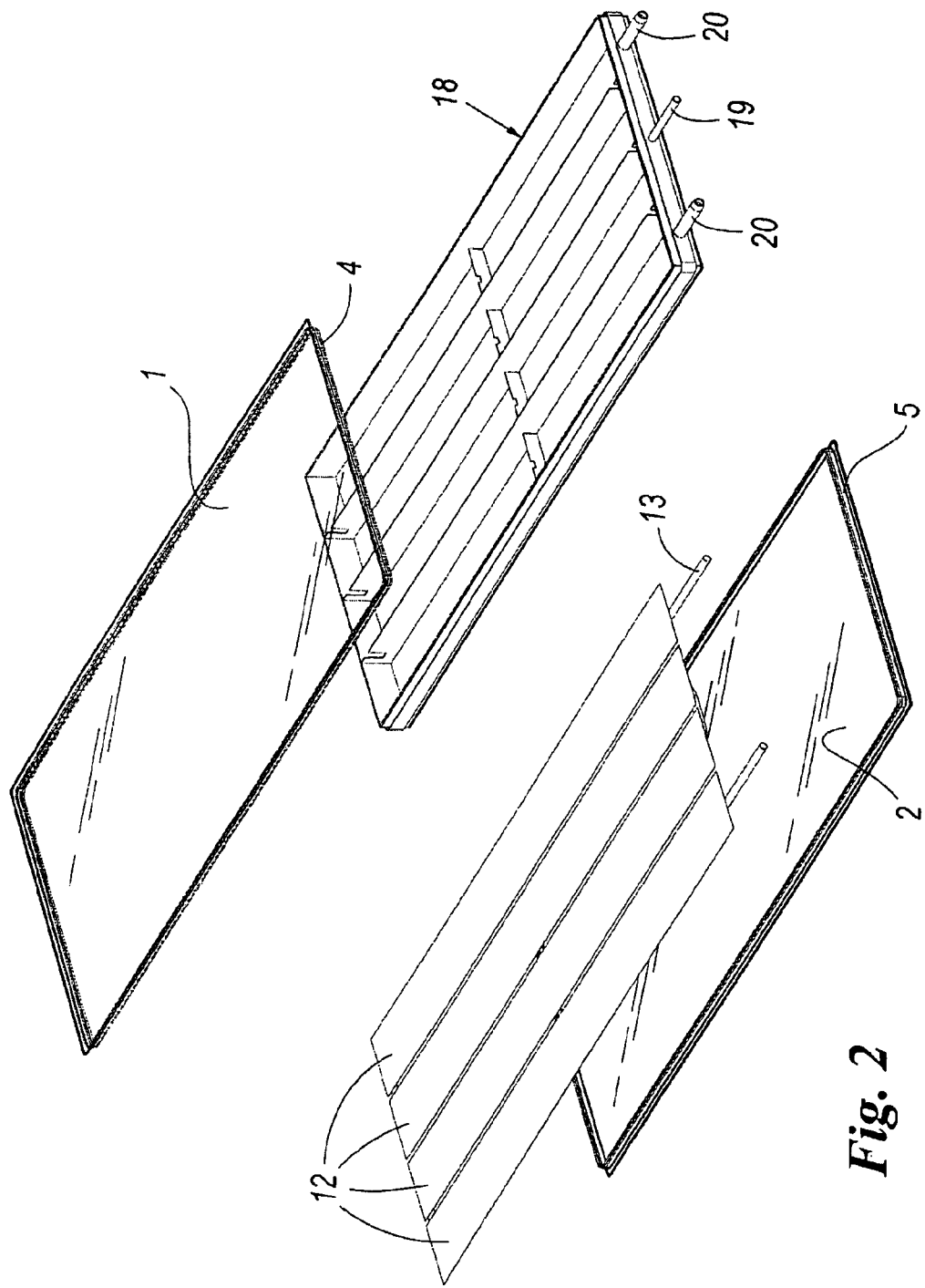
FIG. 2 shows an exploded view of the panel.

FIG. 2 shows an exploded view of the panel, wherein the elements thereof are separated, in order to be better identified.

Figure 3:
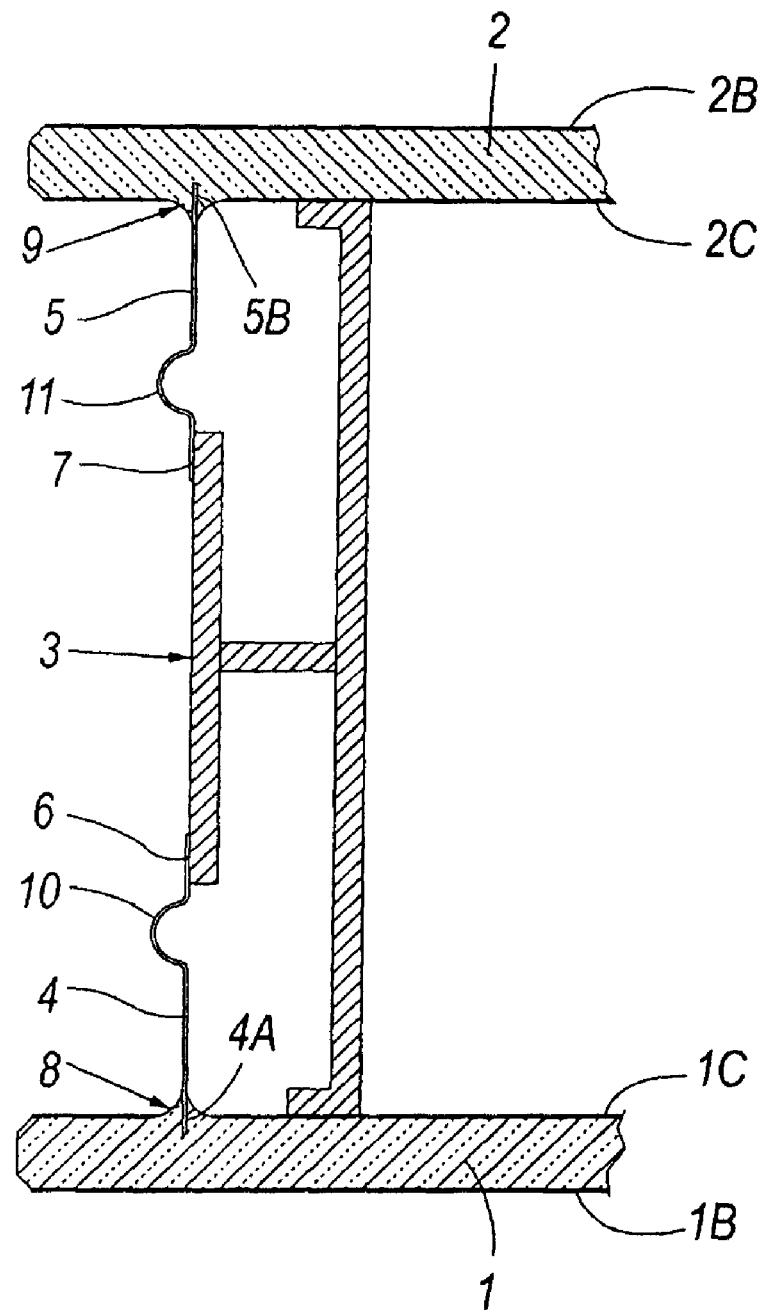
FIG. 3 shows a cross section of the peripheral wall of the vacuum solar thermal panel.
Figure 4:
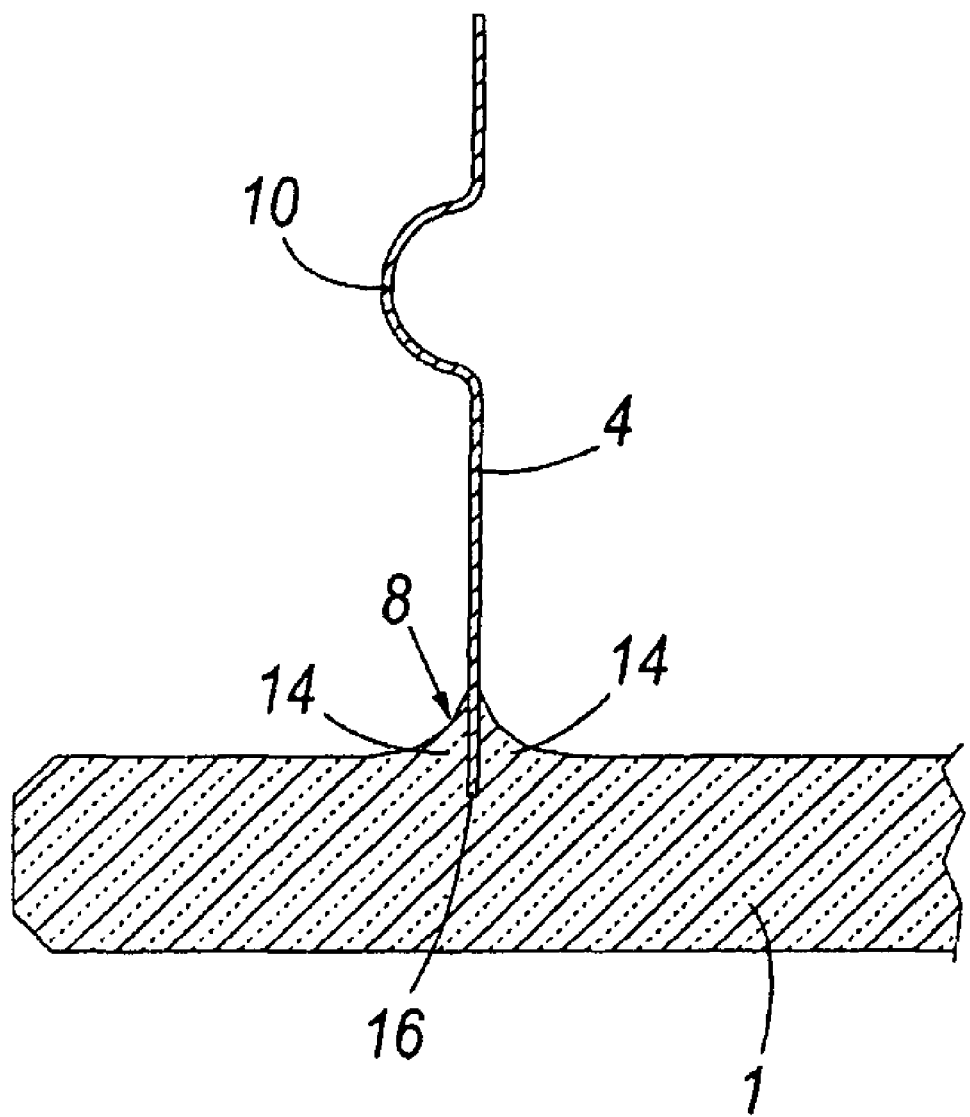
FIG. 4 shows an enlarged cross section of the peripheral wall of the vacuum solar thermal panel, showing a matched bulk glass-metal seal, having the edge of the peripheral belt embedded in the glass plate, according to a first embodiment of the invention.
Figure 5:
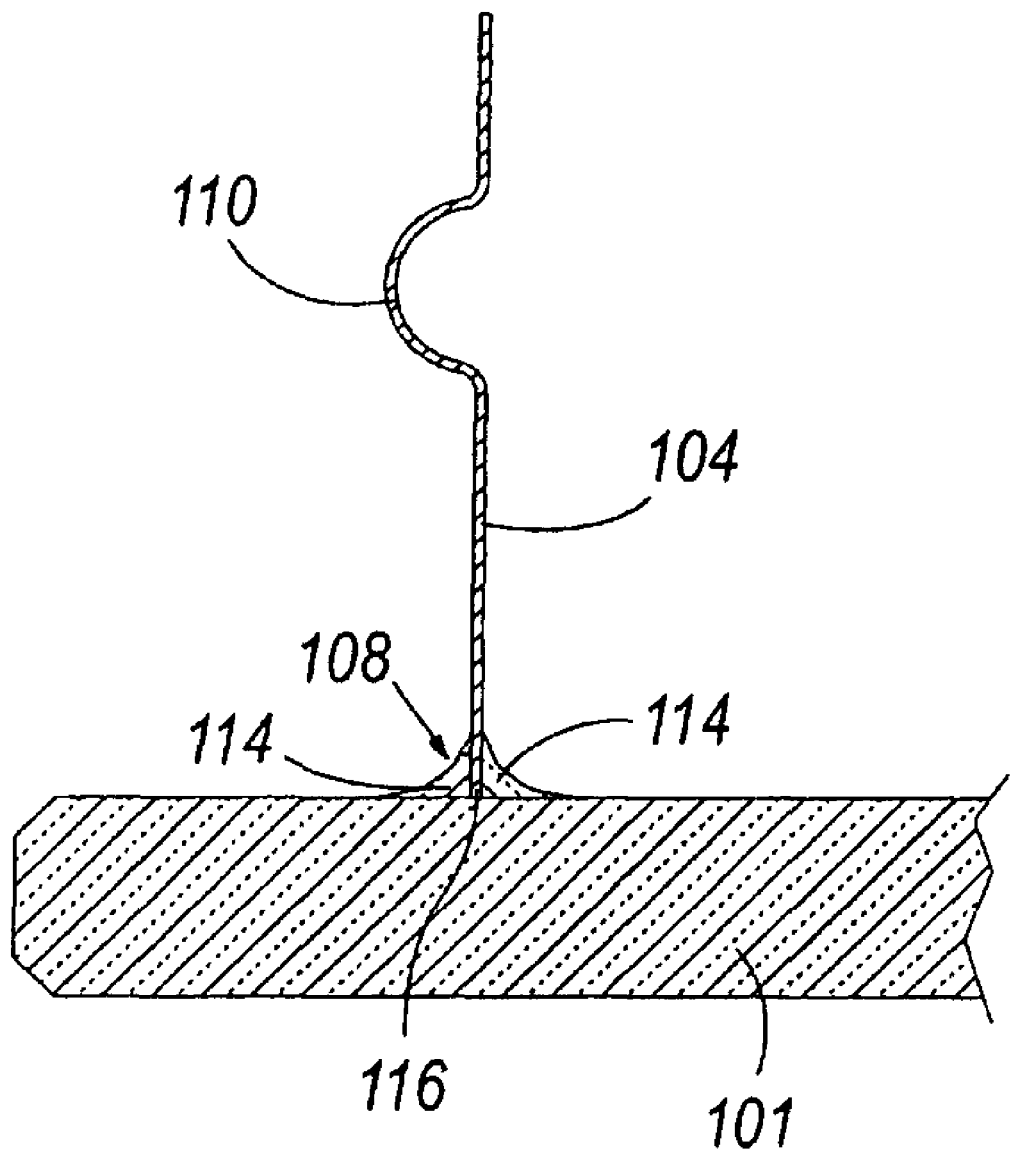
FIGS. 5 and 6 show an enlarged cross section of a first and a second embodiment of the peripheral wall of the vacuum solar thermal panel, showing a compression bulk glass-metal seal, having the edge of the peripheral belt embedded in a ribbon of frit glass joining the peripheral belt to the glass plate, according to a second embodiment of the invention.

FIGS. 3, 4 and 5 show a cross section of the peripheral wall of the vacuum envelope, said peripheral wall comprising the peripheral frame 3, supporting the two plates 1 (or 101 in FIG. 5) and in a spaced-apart arrangement, and the two peripheral belts 4 (or 104 in FIG. 5) and 5 joined to the peripheral frame 3 with a vacuum tight metal-metal seal 6 (or 116 in FIG. 5) and 7 and joined to the first and second glass plates 1, 101 and 2, by means of a vacuum tight bulk glass-metal seal 8 (108 in FIG. 5) and 9.

FIG. 6 shows a single sided solar panel comprising a glass plate 1A supported by a frame 21 comprising a single metallic piece providing the functions of both the metal peripheral frame 3A and the bottom plate 2A, and a chassis 18A for supporting the glass plate 1A and parts of the pipe 13 and the heat absorber 12 (not shown in FIG. 6) connected thereto.

The peripheral frame is connected to the glass plate by a metallic peripheral belt 5A as described above. A controlled expansion alloy with 48% Ni content (NiFe alloy 48) is preferably used for the peripheral belt 4 and 5, because of the close match between its thermal expansion coefficient and that of soda-lime glass.

In the present contest with the term vacuum tight it should be understood following: a seal or component is generally considered to be vacuum tight, if when tested on a helium-peaked mass spectrometer leak detector, shows a leakage rate of less than 10 E-10 cm$^3$ s−1

By the expression "bulk glass-metal seal" 8, 9, 108 a vacuum tight seal between a glass plate 1, 2 or 101 and a metallic peripheral belt 4, 5 or 104 is meant, comprising glass 14 or 114 (FIG. 5) embedding an edge 16, 116 (FIG. 5) of the metallic peripheral belt 4, 5 or 104. The vacuum tight bulk glass-metal seal 8, 9, 108 is obtained by fusion and subsequent solidification of the glass 14, 114 embedding the edge 16, 116 (FIG. 5) of the peripheral belt 4, 5, 104, in order to make the glass 14, 114 directly adhere to the peripheral belt.

The vacuum tight bulk glass-metal seal can be of two kinds, according to the first or to the second embodiment of the invention, respectively:

a) it can be a matched glass-metal seal 8 having the edge 16 of the peripheral belt 4 embedded in the glass material 14 resulting from local melting and subsequent solidification of the glass plates 1, 2 (FIG. 4);

b) it can be a compression glass-metal seal 108, having the edge 116 of the peripheral belt 104 embedded in the glass material 114, resulting from the melting of the frit glass material joining the peripheral belt 104 to the glass plate 101 (FIG. 5).

In both embodiments, the glass material 14, 114 adheres directly to the metallic peripheral belt 4, 104. In the first embodiment the glass material 14 is part of the first plate 1, which is always made of glass, whereas in the second embodiment the glass material 114 is some added frit glass forming a meniscus at the edge of the metallic peripheral belt 104.

When a glass plate is heated, it first becomes soft at a certain temperature and subsequently it melts at a higher temperature becoming liquid or fused.

In the matched glass-metal seal 8 (FIG. 4) the embedding of the edge of the peripheral belt 4 and the adhesion of the glass material 14 to the metallic peripheral belt 4 are achieved by means of localized fusion of the glass plate 1. Localized glass fusion is obtained by heating the peripheral belt together with the glass plate at a temperature close to, but not exceeding, the glass softening point (for soda-lime glass about 720° C.). The peripheral belt 4 is then further heated (e.g. by induction) above the glass softening temperature (about 800° C.), inserted into glass plate 1 for about 1-2 mm and eventually retracted to allow fused glass to form a meniscus at both sides of the peripheral belt. Eventually, the glass plate 1 is quickly cooled to induce the required pre-stress level, following standard rules for tempering.

In the compression glass-metal seal 108 (FIG. 5) the embedding of the edge of the metallic peripheral 104 belt and the adhesion to the metallic peripheral belt 104 are achieved by melting a frit glass having a much lower softening temperature compared to that of the glass plate, and by joining the peripheral belt 104 to the glass plate 101, once solidified. Frit glass, either vitreous or devitrifying, could be chosen to have a thermal expansion coefficient ($\lambda$) slightly lower than that of the components to be sealed, in order to provide some additional compression to the seal. In the case of soda-lime glass and NiFe alloy 48, both having a thermal expansion coefficient $\lambda = 90*10^{-7}$ K$^{-1}$, a frit glass with $\lambda$ around $75*10^{-7}$ K$^{-1}$ could be used. The compression glass-metal seal 104 is obtained by first applying a thick paste, obtained by mixing frit glass powder with a binder and a suitable solvent (for example nitrocellulose and amyl acetate) as a continuous ribbon of about 2 mm height and width on top of a glass plate, then by inserting the peripheral belt in said frit glass paste ribbon and then firing the realised assembly, kept together by a suitable support structure, in a suitable oven.

In particular it has been found advantageous to dry the ribbon of frit glass before inserting the peripheral belt, then to place the glass plate with the dried ribbon up-side down and touching the top edge of the peripheral belt, kept in place by a suitable support structure and then firing the realised assembly in the oven. In such a way the frit glass ribbon once it reaches its melting temperature will flow down along both sides of the peripheral belt thus realizing a perfectly symmetric and homogeneous meniscus for the glass metal seal such as that represented in FIG. 5. Frit firing should follow usual thermal cycle as described in material datasheets (for a typical frit glass, firing temperature will reach 450° C. for about 30 minutes). The support structure should be made such as to compensate for thermal expansion difference with respect to the remaining assembly components.

This may be achieved for example by realizing a support structure or firing gig, in a suitable steel (for example AISI430) and to dimension it in such a way that it reaches the desired dimensions at the frit melting temperature and in that at this temperature it stretches the peripheral metal belt 5 5A 104 and position such belt in the desired location in respect to the glass plate 2 while keeping it in contact with the fused frit.

According to a further aspect of the invention the bulk glass-metal seal can be advantageously improved if at least the metal component embedded in the frit glass is oxidized prior to creating such bulk glass-metal seal; said oxidation being preferably such to produce an approximately uniform and stable oxide layer 4A, 5B approximately regular in thickness and preferably also such to improve bond strength of glass to metal by at least 10% when measured by a shear test.

Said pre-oxidation of the metal component being preferably realized by means of heating in an oven at a temperature suitable to grow a uniform oxide layer on the metal component surface. Of course, other treatments could be envisaged, including for example heating in oxygen enriched atmosphere.

The compression bulk glass-metal seal can also be obtained in a less preferred way by first placing the peripheral belt 104 (FIG. 5) on the surface of the glass plate 1 and subsequently adding the ribbon of frit glass paste 114 on top of the surface of the glass plate 1 at one or both sides of the peripheral belt 104. Said ribbon of frit glass is subsequently melted and solidified again to obtain the glass-metal seal. This latter technique is more complicated than the one described here before, and the presence of a ribbon of frit glass on only one side of the peripheral belt would render the glass metal seal more fragile.

Both matched and compression glass-metal seals 8 and 108 can be reinforced by means of suitable epoxy resin encapsulation at one or both sides of peripheral belt. Epoxy resin for the vacuum side should be chosen such as to have very low outgassing and good stability at high temperature, in order to later withstand a bake-out cycle (i.e. an epoxy resin known with the commercial name of "Torr Seal by Varian" can be used).

The thickness of the peripheral belt 4, 104 should be preferably chosen in the range 0.1-1 mm such as to avoid fissuring under atmospheric pressure, while reducing thermal conduction during welding, to prevent heating of the glass-metal seal, which in turn could make such seal no more vacuum tight.

It should be noted that according to the invention the metallic peripheral belt is continuous i.e. welded to form a continuous belt), vacuum tight and it comprises at least one elastically deformable portion being at least elastically deformable such that it avoids that the bulk glass-metal seal gets damaged and is no more vacuum tight when subject to the evacuation process of said envelope and the thermal treatments of the panel and the potential reciprocal displacements of the glass plate and the joined metallic peripheral belt.

It should be noted that the wording "thermal treatments" of the panel refers both to the glass metal sealing process and to other treatments such as a bake-out thermal treatment of the panel performed at more than 200° C. in order to lower internal pressure while limiting cleaning requirements for the panel by means of pyrolisys.

The above mentioned at least one elastically deformable portion 10, 110 of the metallic peripheral belt 4, 5; 104 is preferably at least elastically deformable such that it permits an elongation of said belt of 0.1-0.3 mm with respect to an axis perpendicular to the glass plate.

According to a further aspect of the invention the metallic peripheral belt 4; 104 comprises an intermediate portion provided between a first and a second portion of said metallic belt, said first portion joining the first glass plate 1; 101 and comprising the vacuum tight bulk glass metal seal 8, 108, said second portion of said metallic belt 4; 104 joining the peripheral frame 3, and comprising a vacuum tight metal-metal seal 6, 116; the at least one elastically deformable portion being provided in said intermediate portion.

According to a further aspect of the invention the at least one elastically deformable portion 10, 110 comprises preferably at least one non rectilinear part or at least one at least partially curved part or at least one ribbing 10, 110. This ribbing 10, 110 is preferably of semicircular form, has a radius comprised between 2 and 4 mm, running for the whole length of the peripheral belt.

When plates 1 and 2 are both made of glass, the peripheral belt is attached thereto by means of a bulk vacuum tight glass-metal seal. If the first plate 1 is made of glass and the second plate 2 is made of metal; a vacuum tight metal-metal seal, obtained for instance by conventional soldering, welding or brazing, can be directly provided to join the peripheral frame to the metal plate, or as described before the peripheral frame and the bottom metal plate may be realized in one single metal piece.

The vacuum envelope of the solar panel according to the invention also comprises a pumping port 19, typically made of a copper tube, connected to a vacuum pump (not shown). After evacuation of the vacuum envelope, the pumping port 19 may be sealed by pinch-off, a typical method used in refrigeration circuits.

An exit port, typically made of a stainless steel tube 20 or bellow, bringing heat absorber pipe 13 outside the vacuum envelope 30, through the peripheral frame 3, while minimizing heat transfer to the same should also be present.

A getter pump of known type may also be present inside the vacuum envelope in order to continuously pumping any residual gas with the notable exception of noble ones.

The invention also relates to a method for the production of a vacuum solar thermal panel comprising a vacuum envelope defining a sealed volume, able to withstand atmospheric pressure, when evacuated, and having at least a first plate 1, 2, 101 made of glass, a metallic peripheral belt 4, 5, 104 and a vacuum tight bulk glass-metal seal between the glass plate 1, 2, 101 and the metallic peripheral belt 4, 5, 104.

According to the present invention, glass material 14, 114 is disposed close to the edge 16, 116 of the peripheral belt 4, 104. Said glass material can be part of said first plate 1 or some added frit glass material 104. Said glass material 14, 114 is heated above its melting temperature and subsequently cooled below said temperature to make the glass material adhering to the peripheral belt and joining it to the glass plate 1, while embedding the edge of the peripheral belt. This can be obtained in two ways: said glass material, positioned close to the edge of the peripheral belt, melted and subsequently solidified again, can come from the glass plate or it can come from a ribbon of frit glass paste, which, when the peripheral belt is disposed with its edge on the surface of the glass plate 101, is placed at both sides of the peripheral belt 104.

When glass forming the bulk glass-metal seal is coming from the glass plate 1 (matched glass-metal seal), the method can be described by the following steps:

the glass plate 1 is heated to a temperature close to but not exceeding its softening temperature;

the peripheral belt 4 is heated to a temperature above the glass plate 1 softening temperature;

an edge 16 of the peripheral belt 4 is pressed against the surface of the glass plate 1 in order to achieve localized fusion and to insert the edge into the glass plate 1, so that the edge 16 of the peripheral belt 4 is embedded by the glass 14 of the glass plate 1;

the peripheral belt 4 is retracted from the glass plate 1, to form a meniscus at both sides of the edge 16 of the peripheral belt 4;

the glass plate 1 and the peripheral belt 4 are cooled to below the glass plate softening temperature, providing a vacuum tight glass-metal seal between the glass plate 1 and the metallic peripheral belt 4.

When the glass forming the bulk glass-metal seal is coming from a ribbon of frit glass paste (compression glass-metal seal), the method can be described by the following steps:

a frit glass paste comprising frit glass material is provided, said frit glass paste being obtained by mixing together a powder of frit glass material, a solvent and a binder;

the frit glass paste is placed on the top of the surface of the glass plate 101, to form a continuous ribbon;

then two possible ways of prosecuting the method are possible:

the ribbon is dried, then the glass plate 101 with the dried ribbon is placed upside down on the peripheral belt 104 touching the edge 116 of the peripheral belt 104, kept in place by a suitable support structure the edge 116 of the peripheral belt 104 is inserted in the ribbon of the frit glass paste contacting also the surface of the glass plate 101;

the frit glass paste is heated and melted to form a meniscus of fused frit glass between the side of the peripheral belt 104 and the surface of the glass plate 101;

the frit glass is cooled and solidified thus providing a vacuum tight bulk glass-metal seal between the glass plate 101 and the metallic peripheral belt 104.

The method for producing a matched glass-metal seal is preferred when thermal pre-stress of glass plate is required, since it can be applied during pre-stress treatment at practically zero-cost, while the method for producing a compression glass-metal seal should be used when no thermal pre-stress of glass plate is envisaged (i.e. in the case of stratified glass), since it requires much lower temperature.

In both cases (matched or compression glass-metal seal) the glass metal seal could then be reinforced by means of suitable epoxy at one or both sides of the peripheral belt as described above.

One advantage of the present invention is that it provides a solar thermal panel provided with a vacuum tight envelope having a glass-metal seal very simple to realize and yet very reliable.

The peripheral belt is made deformable by the presence of ribbing. This allows lowering the stresses induced in the glass-metal seal by the pressure difference between the inside and the outside of the envelope during evacuation of the same and by differential thermal expansion of the panel components during thermal treatments of the panel and in particular a bake-out cycle at a temperature above 200° C.

A further advantage is that the envelope makes no use of toxic or dangerous materials.

It is finally to be noted that many of the inventions described might be incorporated in a vacuum solar panel independently one from the other. This refers in particular to following inventions:

a1) a vacuum solar thermal panel comprising a glass-metal seal, a2) a method for producing a vacuum solar thermal panel, b) a vacuum solar thermal panel characterised in that the metallic peripheral belt is a continuous and vacuum tight belt, and it comprises at least one elastically deformable portion being at least elastically deformable such that it avoids that the bulk glass-metal seal gets damaged and becomes non vacuum tight when subject to the evacuation process of the envelope and the thermal treatments of the panel and the potential reciprocal displacements of the glass plate and the joined metallic peripheral belt.

c1) a vacuum solar thermal panel comprising on the inner side of its glass plates (1, 2) an infra red mirror coating and/or on the external side of the glass plate an anti reflective coating, and or on the inner side of a bottom metal plate and infra red mirror coating.

c2) a method for increasing the efficiency of a vacuum solar thermal panel characterised by applying anti-reflective and/or infrared mirror coatings on the outer and/or inner surfaces, respectively of the glass and/or on the inner side of a bottom metal plate (1, 2, 1A, 2A). It is to be noted that this method comprises preferably also the steps described elsewhere.

d) a single sided vacuum solar and further comprising a metal frame realized in one piece comprising both the peripheral frame 3 and a bottom metal plate of the panel, e) a support structure or firing gig for a vacuum solar panel preferably realized in a suitable steel (for example AISI430) and dimensioned in such a way that it reaches the desired dimensions at the frit melting temperature and in that at this temperature it stretches the peripheral metal belt and position such belt in the desired location in respect to the glass plate, while keeping it in contact with the fused frit, f) a vacuum solar panel having a vacuum tight glass-metal seal, made using a glass based frit in which at least the metal component embedded in the frit is oxidized prior to creating such bulk glass-metal seal; said oxidation being preferably such to produce an approximately uniform and stable oxide layer approximately regular in thickness and preferably also such to improve bond strength of glass to metal by at least 10% when measured by a shear test.

Said pre-oxidation of the metal component being preferably realized by means of heating in an oven at a temperature suitable to grow a uniform oxide layer on the metal component surface (for NiFe alloy 48 typically 10' at 560° C.). It is further to be noted that other treatments could be envisaged, including heating in oxygen enriched atmosphere.

The invention claimed is:

1. A method for the production of a vacuum solar thermal panel comprising a vacuum envelope defining a sealed volume which is able to withstand atmospheric pressure when evacuated, said vacuum envelope comprising a first plate made of glass and a metallic peripheral belt, said method comprising:

providing a vacuum tight glass-metal seal between the first plate and the metallic peripheral belt;

disposing glass material close to the edge of the peripheral belt, heated above its melting temperature and subsequently cooled to below said temperature, in order to allow the glass material to adhere to both sides of the metallic peripheral belt and join the metallic peripheral belt to the first plate;
providing a frit glass paste comprising flit glass material and a binder;
placing the flit glass paste on the top of the surface of the first plate, to form a continuous ribbon;
inserting the edge of the peripheral belt in the ribbon of the flit glass paste, contacting also the surface of the first glass plate;
heating the flit glass paste and melting the flit glass paste to form a meniscus of fused frit glass on one or more sides of the peripheral belt; and
cooling and solidifying the flit glass thus providing a compression vacuum tight bulk glass-metal seal between the first plate and the metallic peripheral belt.

2. The method according to claim 1, wherein the frit glass paste comprising a thermal expansion coefficient which is lower than that of the first plate and metallic belt to be sealed, is used.

3. A method for the production of a vacuum solar thermal panel comprising a vacuum envelope defining a sealed volume which is able to withstand atmospheric pressure when evacuated, said vacuum envelope comprising a first plate made of glass and a metallic peripheral belt, said method comprising:
providing a vacuum tight glass-metal seal between the first plate and the metallic peripheral belt;
disposing glass material close to the edge of the peripheral belt, heated above its melting temperature and subsequently cooled to below said temperature, in order to allow the glass material to adhere to both sides of the metallic peripheral belt and join the metallic peripheral belt to the first plate;
wherein after an insertion of the edge of the peripheral belt into the first plate, the peripheral belt is at least partially retracted from the first plate to form a meniscus at both sides of the edge of the peripheral belt.

4. The method according to claim 3, further comprising:
heating the first plate to a temperature close to but not reaching its softening temperature;
heating the peripheral belt to a temperature above the first plate melting temperature;
pressing an edge of the peripheral belt against the first plate in order to achieve localized fusion and to insert the edge into the first plate, so that the edge of the peripheral belt is embedded in the glass of the first plate; and
cooling the first plate and the peripheral belt to a temperature below the first plate softening temperature, providing a matched vacuum tight glass-metal seal between the first plate and the metallic peripheral belt.

5. A method for the production of a vacuum solar thermal panel comprising a vacuum envelope defining a sealed volume which is able to withstand atmospheric pressure when evacuated, said vacuum envelope comprising a first plate made of glass and a metallic peripheral belt, said method comprising:
providing a vacuum tight glass-metal seal between the first plate and the metallic peripheral belt;
disposing glass material close to the edge of the peripheral belt, heated above its melting temperature and subsequently cooled to below said temperature, in order to allow the glass material to adhere to both sides of the metallic peripheral belt and join the metallic peripheral belt to the first plate;
providing a frit glass paste comprising frit glass material and a binder;
placing the frit glass paste on the top of the surface of the first plate, to form a continuous ribbon;
at least partially drying the ribbon;
placing the plate with the dried ribbon upside down on the peripheral belt touching the top edge of said peripheral belt, said ribbon being unable to flow over said peripheral belt because of said step of at least partially drying,
heating and melting the frit glass paste so that the frit glass paste may at least partially flow down along both sides of the belt and form a substantially symmetric and homogeneous meniscus of fused frit glass on both sides of the peripheral belt; and
cooling and solidifying the frit glass thus providing a compression vacuum tight bulk glass-metal seal between the first plate and the metallic peripheral belt.

6. The method according to claim 5, wherein the frit glass paste comprising a thermal expansion coefficient which is lower than that of the first plate and metallic belt to be sealed, is used.

7. A method for the production of a vacuum solar thermal panel comprising a vacuum envelope defining a sealed volume which is able to withstand atmospheric pressure when evacuated, said vacuum envelope comprising a first plate made of glass and a metallic peripheral belt, said method comprising:
providing a vacuum tight glass-metal seal between the first plate and the metallic peripheral belt; and
disposing glass material close to the edge of the peripheral belt, heated above its melting temperature and subsequently cooled to below said temperature, in order to allow the glass material to adhere to both sides of the metallic peripheral belt and join the metallic peripheral belt to the first plate,
wherein a support structure is used for positioning an edge of the peripheral belt close to the glass material,
wherein said glass material is heated above its melting temperature, and
wherein said support structure is dimensioned in such a way that the support structure reaches the desired dimensions at the glass material melting temperature, said support structure at the glass material melting temperature, stretching the peripheral metal belt and positioning such belt in the desired location with respect to a second glass plate while keeping the peripheral metal belt in contact with the fused glass material.

8. The method according to claim 7, further comprising:
heating the first plate to a temperature close to but not reaching its softening temperature;
heating the peripheral belt to a temperature above the first plate melting temperature;
pressing an edge of the peripheral belt against the first plate in order to achieve localized fusion and to insert the edge into the first plate, so that the edge of the peripheral belt is embedded in the glass of the first plate; and
cooling the first plate and the peripheral belt to a temperature below the first plate softening temperature, providing a matched vacuum tight glass-metal seal between the first plate and the metallic peripheral belt.

9. The method according to claim 7, wherein a frit glass paste comprising a thermal expansion coefficient which is lower than that of the first plate and metallic belt to be sealed, is used.

* * * * *

UNITED STATES PATENT AND TRADEMARK OFFICE
CERTIFICATE OF CORRECTION

PATENT NO. : 8,161,645 B2
APPLICATION NO. : 12/962398
DATED : April 24, 2012
INVENTOR(S) : Vittorio Palmieri Page 1 of 1

It is certified that error appears in the above-identified patent and that said Letters Patent is hereby corrected as shown below:

On the title page, Item (30), the Foreign Application Priority Data should read:

--(30)  Foreign Application Priority Data

Jul. 9, 2008   (IT) ........................................MI2008A001245--

Signed and Sealed this
Third Day of July, 2012

David J. Kappos
*Director of the United States Patent and Trademark Office*